United States Patent
Deng et al.

(10) Patent No.: US 12,425,180 B2
(45) Date of Patent: Sep. 23, 2025

(54) METHOD AND APPARATUS FOR COMMUNICATION BETWEEN TWO COMMUNICATION DEVICES FOR RADIO OVER ETHERNET TRANSPORT

(71) Applicant: Telefonaktiebolaget LM Ericsson (publ), Stockholm (SE)

(72) Inventors: Jun Deng, Beijing (CN); Xin Dai, Beijing (CN); Kai Chen, Beijing (CN)

(73) Assignee: Telefonkaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 17/754,728

(22) PCT Filed: Nov. 7, 2019

(86) PCT No.: PCT/CN2019/116306
§ 371 (c)(1),
(2) Date: Apr. 8, 2022

(87) PCT Pub. No.: WO2021/087875
PCT Pub. Date: May 14, 2021

(65) Prior Publication Data
US 2024/0089078 A1    Mar. 14, 2024

(51) Int. Cl.
*H04L 7/10* (2006.01)
(52) U.S. Cl.
CPC .................... *H04L 7/10* (2013.01)

(58) Field of Classification Search
CPC ...... H04J 3/0647; H04J 3/0658; H04J 3/0638; H04L 7/10; H04L 12/4013
See application file for complete search history.

(56) References Cited

U.S. PATENT DOCUMENTS

2019/0319742 A1* 10/2019 Wu .................. H04L 1/0057
2020/0120754 A1*  4/2020 Fu .................. H04W 56/001
(Continued)

FOREIGN PATENT DOCUMENTS

| CN | 103916315 A | 7/2014 |
| CN | 108242969 A | 7/2018 |

(Continued)

OTHER PUBLICATIONS

International Preliminary Report on Patentability, PCT App. No. PCT/CN2019/116306, May 19, 2022, 6 pages.
(Continued)

*Primary Examiner* — Benjamin H Elliott, IV
(74) *Attorney, Agent, or Firm* — Nicholson De Vos Webster & Elliott LLP

(57) ABSTRACT

A method performed by a first network device comprises reaching a synchronization state with a first communication device based on alignment information of a first interface of the first network device. The alignment information of the first interface includes at least one of a line rate order for line rate iteration, an iteration time interval and an iteration start
(Continued)

time. The method further comprises determining whether a second network device has reached the synchronization state with a second communication device at a same line rate as the first interface, wherein the second network device includes a second interface, and the second network device tries to reach the synchronization state with the second communication device based on the same alignment information as the first interface of the first network device. The method further comprises locking the same line rate at the first interface of the first network device.

18 Claims, 5 Drawing Sheets

(56) References Cited

U.S. PATENT DOCUMENTS

| | | | |
|---|---|---|---|
| 2020/0252889 A1* | 8/2020 | Anand | H04W 92/12 |
| 2020/0252893 A1* | 8/2020 | Anand | H04L 1/0002 |
| 2020/0252980 A1* | 8/2020 | Anand | H04J 3/0608 |
| 2021/0051494 A1* | 2/2021 | Anand | H04L 41/0654 |
| 2021/0084541 A1* | 3/2021 | Anand | H04L 43/50 |
| 2022/0264372 A1* | 8/2022 | Deng | H04W 24/08 |
| 2022/0368445 A1* | 11/2022 | Li | H04L 5/0053 |
| 2024/0089078 A1* | 3/2024 | Deng | H04L 7/10 |

FOREIGN PATENT DOCUMENTS

| | | |
|---|---|---|
| EP | 4040915 A1 | 8/2022 |
| WO | 2017035724 A1 | 3/2017 |
| WO | 2018196511 A1 | 11/2018 |

OTHER PUBLICATIONS

Supplementary European Search Report and Search Opinion, EP App. No. 19951674.1, Aug. 2, 2023, 8 pages.

International Search Report and Written Opinion for Application No. PCT/CN2019/116306, dated Jul. 28, 2020, 9 pages.

CPRI Specification V7.0, "Common Public Radio Interface (CPRI); Interface Specification," Oct. 9, 2015, 128 pages, Ericsson AB et al.

"IEEE Standard for Radio over Ethernet Encapsulations and Mappings," 2018, 77 pages, IEEE Std 1914.3™-2018, IEEE Communications Society, New York, NY.

NGMN Alliance, "NGMN Overview on 5G RAN Functional Decomposition," Feb. 24, 2018, 48 pages, Version 1.0, Next Generation Mobile Networks Ltd.

Raghu M. Rao et al., "A Reconfigurable Architecture for Packet Based 5G Transport Networks," 2018, 4 pages, 2018 IEEE 5G World Forum (5GWF).

L. Valcarenghi et al., "Analytical and Experimental Evaluation of CPRI over Ethernet Dynamic Rate Reconfiguration," 2016, 6 pages, IEEE International Conference on Communications (ICC).

* cited by examiner

500 ⟶

502

Reaching a synchronization state with a first communication device based on alignment information of a first interface of the first network device, wherein the first interface of the first network device is connected with the first communication device and the alignment information of the first interface includes at least one of a line rate order for line rate iteration, an iteration time interval and an iteration start time

504

Determining whether a second network device has reached the synchronization state with a second communication device at a same line rate as the first interface of the first network device, wherein the second network device includes a second interface connected with the second communication device, the second network device tries to reach the synchronization state with the second communication device based on the same alignment information as the first interface of the first network device

506

When both the first network device and the second network device have reached the synchronization state with respective communication devices at the same line rate, locking the same line rate at the first interface of the first network device

602
Reaching a synchronization state with a second communication device based on alignment information of a second interface of the second network device, wherein the second interface of the second network device is connected with the second communication device and the alignment information of the second interface includes at least one of a line rate order for line rate iteration, an iteration time interval and an iteration start time

604
Determining whether a first network device has reached the synchronization state with a first communication device at a same line rate as the second interface of the second network device, wherein the first network device includes a first interface connected with the first communication device, the first network device tries to reach the synchronization state with the first communication device based on the same alignment information as the second interface of the second network device

606
When both the first network device and the second network device have reached the synchronization state with respective communication devices at the same line rate, locking the same line rate at the first interface of the first network device

FIG. 6

METHOD AND APPARATUS FOR COMMUNICATION BETWEEN TWO COMMUNICATION DEVICES FOR RADIO OVER ETHERNET TRANSPORT

CROSS-REFERENCE TO RELATED APPLICATIONS

This application is a National stage of International Application No. PCT/CN2019/116306, filed Nov. 7, 2019, which is hereby incorporated by reference.

TECHNICAL FIELD

The non-limiting and exemplary embodiments of the present disclosure generally relate to the technical field of communications, and specifically to methods and apparatuses for communication between two communication devices.

BACKGROUND

This section introduces aspects that may facilitate a better understanding of the disclosure. Accordingly, the statements of this section are to be read in this light and are not to be understood as admissions about what is in the prior art or what is not in the prior art.

In a communication system, various interfaces may be defined between two communication devices. For example, common public radio interface (CPRI) is an interface between two communication devices such as radio equipment (RE) and radio equipment control (REC), as defined in http://www.cpri.info/. As shown in the CPRI architecture of FIG. 1, CPRI carries control & management, synchronization, and user data. The term SAP refers to service access point. For example, the control plane and management plane are mapped to $SAP_{CM}$. The user plane is mapped to a $SAP_{IQ}$. The synchronization (Sync) is mapped to a $SAP_S$. Each link connects two ports which have asymmetrical functions and roles: a master and a slave. According to CPRI specification 7.0, the disclosure of which is incorporated by reference herein in its entirety, CPRI line rate can be selected from 10 options: 614.4 Mbps, 1228.8 Mbps, 2457.6 Mbps, 3072.0 Mbps, 4915.2 Mbps, 6144.0 Mbps, 9830.4 Mbps, 10137.6 Mbps, 12165.12 Mbps, and 24330.24 Mbps. At initial start-up procedure, REC and RE can do auto-negotiation on the line rate.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

CPRI bit rate auto-negotiation may be done in such a way that REC and RE try different line rates in different order and time interval to try to meet at a common line rate—L1 (layer 1) synchronization. REC and RE can negotiate to migrate to a new bit rate from current running line rate. There is no problem if fiber direct connection or WDM passive mux/de-mux is used between REC and RE.

The following Table 1 shows how the master port and the slave port negotiate the line rate. As shown, the REC tries CPRI line rate options 7, 5, 3, 1 in decreasing order in a shorter time interval (e.g. 1 second). The RE tries CPRI line rate options 1, 3, 7 in increasing order in a longer interval (e.g. 3 seconds). At time interval index 8, the two ports meet at a common bit rate of CPRI line rate option 7, and from then on, the CPRI will work on that rate.

TABLE 1

| CPRI auto-negotiation | | | | | | | | | | | |
|---|---|---|---|---|---|---|---|---|---|---|---|
| Time interval index | 0 | 1 | 2 | 3 | 4 | 5 | 6 | 7 | 8 | 9 | 10 |
| Master port line rate option | 7 | 5 | 3 | 1 | 7 | 5 | 3 | 1 | 7 | 7 | 7 |
| Slave port line rate option | | 1 | | | 3 | | | 7 | | 7 | 7 |

RoE defined in institute of electrical and electronics engineers (IEEE) 1914.3-2018 (Approved 27 Sep. 2018) provides the encapsulation and mapping of radio protocols for transport over Ethernet frames using RoE. Three modes are defined: structure-agnostic mode for CPRI or any other radio, structure-aware mode for CPRI, and native mode for control and in-phase/quadrature (I/Q) data. FIG. 2 illustrates the encapsulation of RoE. The term DA refers to destination address and the term SA refers to source address. The term FCS refers to frame check sequence.

The REC and RE have been directly connected in traditional deployment and the bit rate can be auto-negotiated by the CPRI master and slave ports in such direct connection. In the cases that transport devices introduced, especially the transport devices working on layer 2 or higher layers, e.g RoE and OTN, the direct connection between CPRI master and slave ports are segregated by the transport devices. There should be new methods in those transport devices to facilitate the legacy CPRI auto-negotiation continue working as it has done As shown in FIG. 3, if RoE equipments are installed between REC and RE, the line rate negotiation will be interrupted. There is no definition in IEEE 1914.3 or other standards to define how to solve this problem. However CPRI auto-negotiation may be mandatory functionality in some networks.

The present disclosure provides a solution implemented in the network devices installed between the communication devices (i.e. REC and RE) to facilitate the communication devices to continue the existing bit rate auto-negotiation in the existing way.

In a first aspect of the disclosure, there is provided a method performed by a first network device. The method comprises reaching a synchronization state with a first communication device based on alignment information of a first interface of the first network device. The first interface of the first network device is connected with the first communication device and the alignment information of the first interface includes at least one of a line rate order for line rate iteration, an iteration time interval and an iteration start time. The method further comprises determining whether a second network device has reached the synchronization state with a second communication device at a same line rate as the first interface of the first network device, wherein the second network device includes a second interface connected with the second communication device, the second network device tries to reach the synchronization state with the second communication device based on the same alignment information as the first interface of the first network device. The method further comprises when both the first network device and the second network device have reached the synchronization state with respective communication devices at the same line rate, locking the same line rate at the first interface of the first network device.

In an embodiment, when at least one of the first network device or the second network device has not reached the synchronization state with respective communication devices at the same line rate, iteratively performing at least one of the steps of reaching, detecting and locking by using a next line rate.

In an embodiment, the line rate may be selected from a plurality of line rates in a round robin fashion.

In an embodiment, the first network node and the second network node may belong to a transport network over which a link connected between the first communication device and the second communication device is bridged.

In an embodiment, the first network device and the second network device may be time synchronized.

In an embodiment, the alignment information of the first interface of the first network device is configured by a message or preconfigured.

In an embodiment, the first network device may be one of a radio over Ethernet, RoE, device, a flexible Ethernet device, an optical transport network, OTN, device and a wavelength division multiplexing, WDM, device and the second network device may be one of a RoE device, a flexible Ethernet device, an OTN device, a WDM device.

In an embodiment, the first communication device may include one of a Radio Equipment Control, REC, device or a Radio Equipment, RE, device and the second communication device includes one of a REC device or a RE device.

In an embodiment, the first interface of the first network device may include a common public radio interface, CPRI, and the second interface of the second network device may include a CPRI.

In an embodiment, the step of determining may comprise determining whether the second network device has reached the synchronization state with a second communication device at a same line rate as the first interface of the first network device and at the iteration time interval that the first network device has reached the synchronization state with the first communication device.

In a second aspect of the disclosure, there is provided a method performed by a second network device. The method comprises reaching a synchronization state with a second communication device based on alignment information of a second interface of the second network device. The second interface of the second network device is connected with the second communication device and the alignment information of the second interface includes at least one of a line rate order for line rate iteration, an iteration time interval and an iteration start time. The method further comprises determining whether a first network device has reached the synchronization state with a first communication device at a same line rate as the second interface of the second network device. The first network device includes a first interface connected with the first communication device. The first network device tries to reach the synchronization state with the first communication device based on the same alignment information as the second interface of the second network device. The method further comprises when both the first network device and the second network device have reached the synchronization state with respective communication devices at the same line rate, locking the same line rate at the second interface of the second network device.

In an embodiment, the alignment information of the second interface of the second network device may be configured by a message or preconfigured.

In an embodiment, the step of determining comprises determining whether the first network device has reached the synchronization state with a first communication device at a same line rate as the second interface of the second network device and at the iteration time interval that the second network device has reached the synchronization state with the second communication device.

In a third aspect of the disclosure, there is provided an apparatus implemented in a first network device. The apparatus comprises a processor; and a memory coupled to the processor, said memory containing instructions executable by said processor, whereby said apparatus is operative to reach a synchronization state with a first communication device based on alignment information of a first interface of the first network device. The first interface of the first network device is connected with the first communication device and the alignment information of the first interface includes at least one of a line rate order for line rate iteration, an iteration time interval and an iteration start time. Said apparatus is operative to determine whether a second network device has reached the synchronization state with a second communication device at a same line rate as the first interface of the first network device, The second network device includes a second interface connected with the second communication device, the second network device tries to reach the synchronization state with the second communication device based on the same alignment information as the first interface of the first network device. Said apparatus is operative to when both the first network device and the second network device have reached the synchronization state with respective communication devices at the same line rate, lock the same line rate at the first interface of the first network device.

In a fourth aspect of the disclosure, there is provided an apparatus implemented in a second network device. The apparatus comprises a processor; and a memory coupled to the processor, said memory containing instructions executable by said processor, whereby said apparatus is operative to reach a synchronization state with a second communication device based on alignment information of a second interface of the second network device. The second interface of the second network device is connected with the second communication device and the alignment information of the second interface includes at least one of a line rate order for line rate iteration, an iteration time interval and an iteration start time. Said apparatus is operative to determine whether a first network device has reached the synchronization state with a first communication device at a same line rate as the second interface of the second network device. The first network device includes a first interface connected with the first communication device. The first network device tries to reach the synchronization state with the first communication device based on the same alignment information as the second interface of the second network device. Said apparatus is operative to when both the first network device and the second network device have reached the synchronization state with respective communication devices at the same line rate, lock the same line rate at the second interface of the second network device.

In a fifth aspect of the disclosure, there is provided a first network device. The first network device comprises a synchronization module, a determining module and a locking module. The synchronization module may be configured to reach a synchronization state with a first communication device based on alignment information of a first interface of the first network device. The first interface of the first network device is connected with the first communication device and the alignment information of the first interface includes at least one of a line rate order for line rate iteration, an iteration time interval and an iteration start time. The determining module may be configured to determine whether a second network device has reached the synchronization state with a second communication device at a same line rate as the first interface of the first network device. The second network device includes a second interface connected with the second communication device, the second network device tries to reach the synchronization state with the second communication device based on the same alignment information as the first interface of the first network device. The locking module may be configured to lock the same line rate at the first interface of the first network device when both the first network device and the second network device have reached the synchronization state with respective communication devices at the same line rate.

In a sixth aspect of the disclosure, there is provided a second network device. The second network device comprises a synchronization module, a determining module and a locking module. The synchronization module may be configured to reach a synchronization state with a second communication device based on alignment information of a second interface of the second network device. The second interface of the second network device is connected with the second communication device and the alignment information of the second interface includes at least one of a line rate order for line rate iteration, an iteration time interval and an iteration start time. The determining module may be configured to determine whether a first network device has reached the synchronization state with a first communication device at a same line rate as the second interface of the second network device. The first network device includes a first interface connected with the first communication device, the first network device tries to reach the synchronization state with the first communication device based on the same alignment information as the second interface of the second network device. The locking module may be configured to lock the same line rate at the second interface of the second network device when both the first network device and the second network device have reached the synchronization state with respective communication devices at the same line rate.

In a seventh aspect of the disclosure, there is provided a computer program product, comprising instructions which, when executed on at least one processor, cause the at least one processor to carry out the method according to any of the above first to second aspects.

In an eighth aspect of the disclosure, there is provided a computer-readable storage medium storing instructions which when executed by at least one processor, cause the at least one processor to carry out the method according to any of the above first to second aspects.

Embodiments herein afford many advantages, of which a non-exhaustive list of examples follows. Some embodiments can solve the auto-negotiation problem when there are two or more network devices used to bridge the communication of two communication devices. Some embodiments be used in Ethernet fronthaul equipment to solve the CPRI auto-negotiation problem. For example, such auto-negotiation is mandatory for some RAN deployment. Without auto-negotiation, baseband and remote radio unit can only worked at predefined bit rate or can not communicate with each other. The embodiments herein are not limited to the features and advantages mentioned above. A person skilled in the art will recognize additional features and advantages upon reading the following detailed description.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 5 shows a flowchart of a method according to an embodiment of the present disclosure;

FIG. 6 shows a flowchart of a method according to another embodiment of the present disclosure;

DETAILED DESCRIPTION

Figure 1:
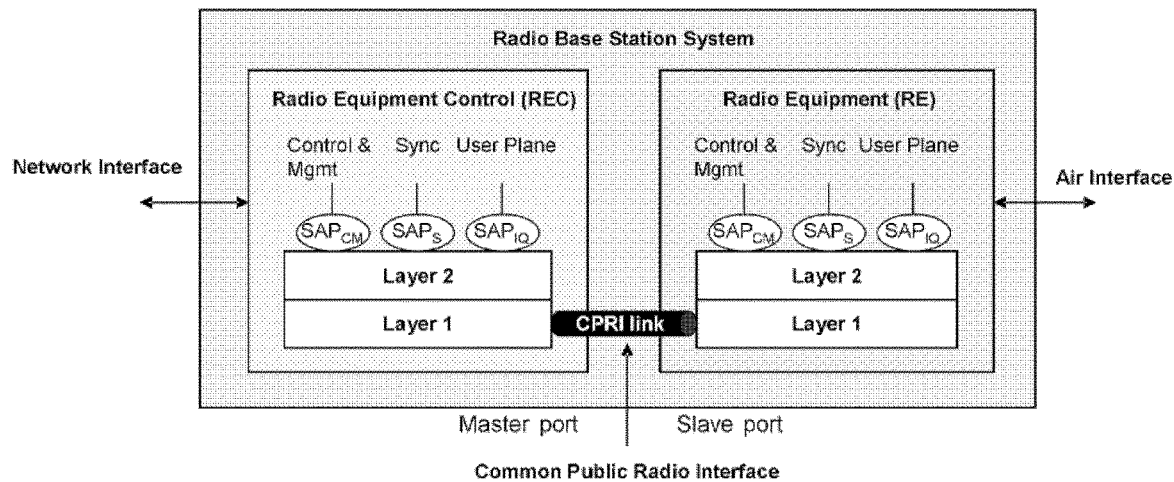
FIG. 1 is a diagram illustrating a system architecture with a CPRI link between RE and REC.
Figure 2:
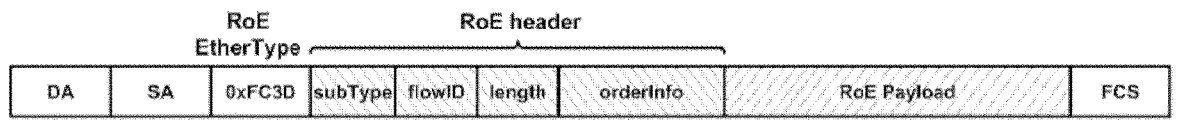
FIG. 2 is a diagram illustrating RoE encapsulation.
Figure 3:
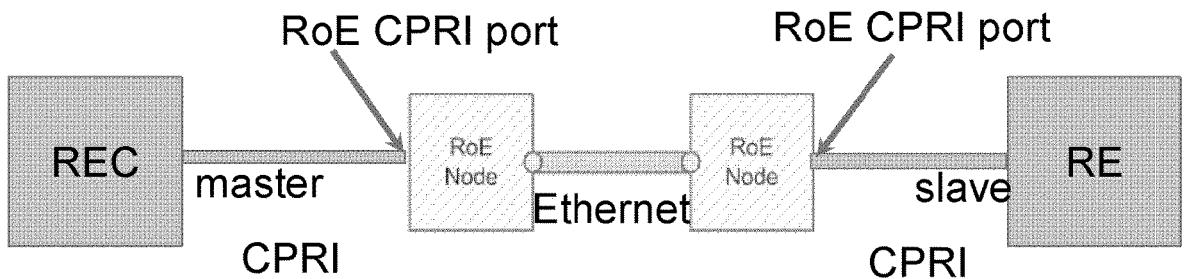
FIG. 3 is a diagram illustrating a CPRI connection with RoE nodes deployed as transport equipments in fronthaul.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

It is noted that though the embodiments are mainly described in the context of network device such as radio over Ethernet (RoE) device and communication devices such as Radio Equipment Control (REC) device or Radio Equipment (RE) device, they are not limited to this but can be applied to any suitable network devices such as various transport devices (e.g., flexible Ethernet device, optical transport network (OTN) device and wavelength division multiplexing (WDM) device, etc.) or any suitable communication devices such as access network device and core network device of a wireless communication network.

Figure 4:
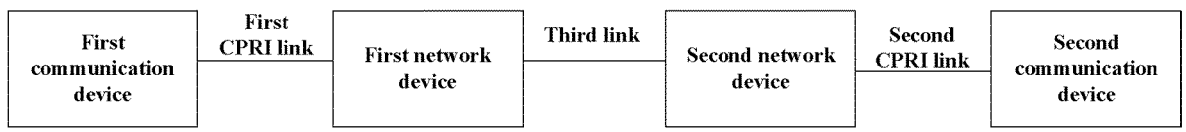
FIG. 4 is a diagram illustrating an exemplary communication system into which an embodiment of the disclosure is applicable.

FIG. 4 is a diagram illustrating an exemplary communication system into which an embodiment of the disclosure is applicable. As shown, the communication system may comprise a first communication device, a second communication device, a first network device and a second network device. The first communication device and the second communication device may be any suitable communication devices which require information exchange between them. As a first example, the first communication device may be a RE and the second communication device may be a REC. As a second example, the first communication device may be a RE and the second communication device may be a RE. As a third example, the first communication device may be a REC and the second communication device may be a RE. As a fourth example, the first communication device may be a REC and the second communication device may be a REC. As a fifth example, the first communication device may be a part of a radio base station and the second communication device may be another part of the radio base station.

For example, the radio base station can be a decomposed into two basic building blocks, i.e., the REC and the RE. Both parts may be physically separated (i.e., the RE may be close to the antenna, whereas the REC may be located in a conveniently accessible site) or both may be co-located as in a conventional radio base station design. The REC may contain the radio functions of the digital baseband domain, whereas the RE may contain the analogue radio frequency functions. The functional split between both parts may be done in such a way that a generic interface based on In-Phase and Quadrature (IQ) data can be defined. For example, for the Universal Mobile Telecommunications System (UMTS) radio access network, the REC may provide access to the Radio Network Controller via the Iub interface, whereas the RE may serve as the air interface, called the Uu interface, to the user equipment. For WiMAX (Worldwide Interoperability for Microwave Access), the REC may provide access to network entities (e.g. other base station, Access Service Network Gateway (ASN-GW)), whereas the RE may serve as the air interface to the subscriber station/mobile subscriber station (SS/MSS). For Evolved Universal Terrestrial Radio Access (E-UTRA), the REC may provide access to the Evolved Packet Core for the transport of user plane and control plane traffic via S1 interface, whereas the RE may serve as the air interface to the user equipment. For Global System for Mobile communication (GSM), the REC may provide access to the Base Station Controller via the Abis interface, whereas the RE may serve as the air interface, called the Um interface, to the mobile station.

The first network device and the second network device may be any suitable network devices which are able to support at least data transmission function. For example, the first network device may be one of a RoE device, a flexible Ethernet device, an OTN device and a WDM device. The second network device may be one of a RoE device, a flexible Ethernet device, an OTN device, a WDM device or the like. In an embodiment, the first network device and the second network device may have the same device type.

As shown, the first network device is connected with the first communication device through a first CPRI link. The second network device is connected with the second communication device through a second CPRI link. Thus, there is a CPRI port in the first network device which is connected to the first communication device. There is a CPRI port in the second network device which is connected to the second communication device. It is noted that though only one CPRI port is shown in each of the first network device and the second network device, there may be two or more CPRI ports in each network device which can be connected to two or more communication devices respectively.

The first network device is connected with the second network device through a third link. Examples of the third link may include, but not limited to, an RoE link, a flex Ethernet link, an OTN link, a WDM link, etc. Note that the type of the third link is not necessarily different than CPRI. In other words, the principle of the present disclosure is also applicable to the scenario that the third link is a CPRI link. Also note that there may be other equipment(s) between the first and second network devices.

In an embodiment, the first network node and the second network node belong to a transport network over which a link connected between the first communication device and the second communication device is bridged. The transport network may be any transport network either currently known or to be developed in the future.

In an embodiment, the first network device and the second network device are time synchronized. The time synchronization can be done by some tool like NTP (Network Time Protocol) and the purpose is to ensure the two network devices will have synchronized iterate steps which will be described following.

FIG. 5 shows a flowchart of a method 500 according to an embodiment of the present disclosure, which may be performed by an apparatus implemented in or as or communicatively coupled to a first network device or any other entity having similar functionality. As such, the first network device may provide means or modules for accomplishing various parts of the method 500 as well as means or modules for accomplishing other processes in conjunction with other components. Examples of the first network device have been described above with reference to FIG. 4.

At block 502, the first network device may reach a synchronization state with a first communication device based on alignment information of a first interface of the first network device. The first interface of the first network device is connected with the first communication device. The alignment information of the first interface includes at least one of a line rate order for line rate iteration, an iteration time interval and an iteration start time. Examples of the first communication device have been described above with reference to FIG. 4. The first interface can be any suitable communication interface either currently known or to be developed in the future. In an embodiment, the first interface of the first network device may include CPRI. The first interface of the first network device may support at least one of multiple line rates. For example, when the interface is CPRI, CPRI line rate can be selected from 10 options: 614.4 Mbps, 1228.8 Mbps, 2457.6 Mbps, 3072.0 Mbps, 4915.2 Mbps, 6144.0 Mbps, 9830.4 Mbps, 10137.6 Mbps, 12165.12 Mbps, and 24330.24 Mbps. In general, a CPRI of a specific device can support at least one of the 10 CPRI line rate options. The line rate order for line rate iteration can be any suitable order such as ascending order or descending order or configured order. In an embodiment, the line rate may be selected from a plurality of line rates in a round robin fashion. For example, the line rates may be selected from the available set in a round robin fashion, e.g., first highest, the second highest, . . . , the slowest, and then restarting from the highest line bit rate.

In an embodiment, the alignment information of the first interface of the first network device may be configured by a message or preconfigured. The iteration time interval can be any suitable time interval such as predefined time interval or configured time interval, etc. The iteration start time can be a configured time. The first network device may obtain at least one of the line rate order for line rate iteration, the iteration time interval and the iteration start time from another network device such as the second network device or a network management device, etc. For example, the second network device may obtain at least one of the line rate order for line rate iteration, the iteration time interval and the iteration start time from the network management device and forward this information to the first network device.

The first network device may reach the synchronization state with the first communication device by using various ways. For example, a line rate auto-negotiation may be performed by the first network device and the first communication device. When the first interface is CPRI, the line rate auto-negotiation may be similar to the corresponding line rate auto-negotiation as described in CPRI version 7.0. When the first interface is other interface, any other suitable negotiation methods may be used.

For example, the first network device may try to reach the synchronization state with the first communication device at the iteration start time. The first interface (such as CPRI) of the first network device may switch to a working bit rate according to the line rate order for line rate iteration. The first network device may monitor whether data such as CPRI frames have been successfully received from the first communication device. For example, the status of the first interface may be checked. If the status is DOWN, it means no data have been successfully received. On the other hand, if the status is UP, it means data have been successfully received. When the successful reception of data is monitored, the first network device reaches the synchronization state with the first communication device. When no data have been successfully received during the iteration time interval, the first interface (such as CPRI) of the first network device may switch to another working bit rate according to the line rate order for line rate iteration until reaching the synchronization state.

At block 504, the first network device may determine whether a second network device has reached the synchronization state with a second communication device at a same line rate as the first interface of the first network device. The second network device includes a second interface connected with the second communication device. The second network device tries to reach the synchronization state with the second communication device based on the same alignment information as the first interface of the first network device. Examples of the second network device and the second communication device have been described above with reference to FIG. 4. The procedure of the second network device reaching the synchronization state with the second communication device may be similar to the synchronization procedure of the first network device as described above. The second network device may obtain at least one of the line rate order for line rate iteration, the iteration time interval and the iteration start time from another network device such as the first network device or a network management device, etc. For example, the first network device may obtain at least one of the line rate order for line rate iteration, the iteration time interval and the iteration start time from the network management device and forward this information to the second network device.

The first network device may determine whether the second network device has reached the synchronization state with the second communication device at the same line rate as the first interface of the first network device in various ways. It can be done in many places of the first network device. It can also be done in the second network device but sent to the first network device by a control message. For example, the first network device may send a request message to the second network device to inquire whether the second network device has reached the synchronization state with the second communication device at the same line rate as the first interface of the first network device. The second network device can send a response message including the inquiring result to the first network device. Alternatively, the second network device may actively send information regarding whether the second network device has reached the synchronization state with the second communication device at a certain line rate. When the first network device receive this information, it can determine whether the second network device has reached the synchronization state with the second communication device at the same line rate as the first interface of the first network device.

In an embodiment, the first network device may determine whether the second network device has reached the synchronization state with a second communication device at a same line rate as the first interface of the first network device and at the iteration time interval that the first network device has reached the synchronization state with the first communication device.

The following Tables show some exemplary processes according to some embodiments of the disclosure. In these exemplary processes, the first network device is the first RoE which is connected with the REC (or RE) and the second network device is the second RoE equipment which is connected with the RE (or REC). Table 2 shows the CPRI auto negotiation example that the REC and RE are directly connected with a CPRI link, i.e., CPRI auto negotiation without transport equipment such as RoEs.

formed by an apparatus implemented in or as or communicatively coupled to a second network device or any other entity having similar functionality. As such, the second network device may provide means or modules for accomplishing various parts of the method 600 as well as means or modules for accomplishing other processes in conjunction with other components. Examples of the second network device have been described above with reference to FIG. 4. For some parts which have been described in the above embodiments, detailed description thereof is omitted here for brevity.

At block 602, the second network device may reach a synchronization state with a second communication device based on alignment information of a second interface of the second network device. The second interface of the second network device is connected with the second communication device. The alignment information of the second interface includes at least one of a line rate order for line rate iteration, an iteration time interval and an iteration start time. Examples of the second communication device have been described above with reference to FIG. 4. The second interface can be any suitable communication interface either currently known or to be developed in the future. In an embodiment, the second interface of the second network device may include CPRI. The second interface of the second network device may support at least one of multiple

TABLE 2

| Time Interval index | 0 | 1 | 2 | 3 | 4 | 5 | 6 | 7 | 8 | 9 | 10 |
|---|---|---|---|---|---|---|---|---|---|---|---|
| Master port line rate option of REC | 7 | 5 | 3 | 1 | 7 | 5 | 3 | 1 | 7 | 7 | 7 |
| Slave port line rate option of RE | | 1 | | | 3 | | | 7 | | 7 | 7 |

Table 3 shows the CPRI auto negotiation example that there are transport equipment installed between the REC and RE, i.e., CPRI auto negotiation with transport equipments such as RoEs. And the transport equipment iterate among CPRI option 1, 3, 7 and the time interval is 4 seconds to supporting REC and RE to reach a common option.

line rates. For example, when the interface is CPRI, CPRI line rate can be selected from 10 options: 614.4 Mbps, 1228.8 Mbps, 2457.6 Mbps, 3072.0 Mbps, 4915.2 Mbps, 6144.0 Mbps, 9830.4 Mbps, 10137.6 Mbps, 12165.12 Mbps, and 24330.24 Mbps. In general, a CPRI of a device can support at least one of the 10 CPRI line rate options. The

TABLE 3

| Time Interval index | 0 | 1 | 2 | 3 | 4 | 5 | 6 | 7 | 8 | 9 | 10 | 11 |
|---|---|---|---|---|---|---|---|---|---|---|---|---|
| Master port line rate option of REC | 7 | 5 | 3 | 1 | 7 | 5 | 3 | 1 | 7 | 7 | 7 | 7 |
| The first interface line rate option (to e.g., REC) | | | 1 | | | 3 | | | 7 | | | |
| The second interface line rate option (to e.g., RE) | | | 1 | | | 3 | | | 7 | | | |
| Slave port line rate option of RE | | | 1 | | | 3 | | | 7 | 7 | 7 | 7 |

At block 506, when both the first network device and the second network device have reached the synchronization state with respective communication devices at the same line rate, the first network device may lock the same line rate at the first interface of the first network device. In addition, the second network device may lock the same line rate at the second interface of the second network device.

In an embodiment, when at least one of the first network device or the second network device has not reached the synchronization state with respective communication devices at the same line rate, the first network device may iteratively perform at least one of blocks 502, 504 and 506 by using a next line rate.

FIG. 6 shows a flowchart of a method 600 according to an embodiment of the present disclosure, which may be perline rate order for line rate iteration can be any suitable order such as ascending order or descending order or configured order. In an embodiment, the line rate may be selected from a plurality of line rates in a round robin fashion. For example, the line rates may be selected from the available set in a round robin fashion, e.g., first highest, the second highest, . . . , the slowest, and then restarting from the highest line bit rate.

In an embodiment, the alignment information of the second interface of the second network device may be configured by a message or preconfigured. The iteration time interval can be any suitable time interval such as predefined time interval or configured time interval, etc. The iteration start time can be a configured time. The second network device may obtain at least one of the line rate order for line rate iteration, the iteration time interval and the iteration start time from another network device such as the first network device or a network management device, etc. For example, the first network device may obtain at least one of the line rate order for line rate iteration, the iteration time interval and the iteration start time from the network management device and forward this information to the second network device.

The second network device may reach the synchronization state with the second communication device by using various ways such as the ways as described with reference to the first network device.

At block 604, the second network device may determine whether a first network device has reached the synchronization state with a first communication device at a same line rate as the second interface of the second network device. The first network device includes a first interface connected with the first communication device. The first network device tries to reach the synchronization state with the first communication device based on the same alignment information as the second interface of the second network device. Examples of the first network device and the first communication device have been described above with reference to FIG. 4. The procedure of the first network device reaching the synchronization state has been described above. The second network device may determine whether the first network device has reached the synchronization state with the first communication device at the same line rate as the second interface of the second network device in various ways. It can be done in many places of the second network device. It can also be done in the first network device but sent to the second network device by a control message. The synchronization state determination of the first and second network devices may be similar.

In an embodiment, the second network device may determine whether the first network device has reached the synchronization state with a first communication device at a same line rate as the second interface of the second network device and at the iteration time interval that the second network device has reached the synchronization state with the second communication device.

At block 606, when both the first network device and the second network device have reached the synchronization state with respective communication devices at the same line rate, the second network device may lock the same line rate at the second interface of the second network device.

In an embodiment, when at least one of the first network device or the second network device has not reached the synchronization state with respective communication devices at the same line rate, the second network device may iteratively perform at least one of blocks 602, 604 and 606 by using a next line rate.

In an embodiment, the methods 500 and 600 can support CPRI Auto-negotiation in transport equipment like RoE equipment installed between the REC and RE. There may be a pair of RoE equipments between the REC and RE and there is an Ethernet link between the pair of RoE equipments. There may be or no other equipment on the Ethernet link. There may be two CPRI ports in the pair of the RoE equipments, wherein one CPRI port is connected to REC and the other CPRI port is connected to RE. The pair of RoE equipments are time synchronized. The CPRI line bit rate option order for rate iteration, iteration interval and iteration start time may be aligned between the pair of RoE equipments. This alignment can be preconfigured or by a message. At the iteration start time, the pair of RoE equipments may start to iterate CPRI line rate in aligned CPRI line bit rate option order and iteration interval. Both of the pair of RoE equipments try to detect the CPRI status. Both of the two RoE CPRI ports lock on the same CPRI bit rate if the detection of CPRI status of both of the pair of RoE equipments is OK. Both of the two RoE CPRI ports may continue to iterate and switch to the next CPRI line bit rate option if the detection of the CPRI status of at least one of the pair of RoE equipments is not OK.

Figure 7:
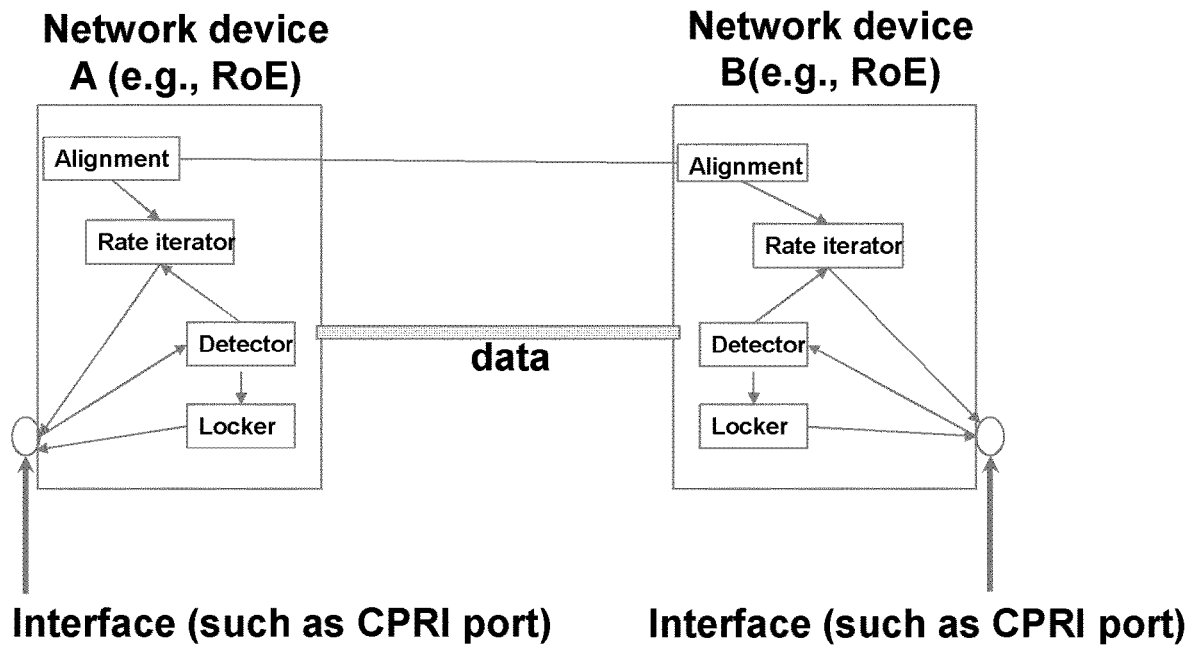
FIG. 7 shows a component diagram of network devices supporting line bit rate auto negotiation according to an embodiment of the present disclosure.

FIG. 7 shows a component diagram of network devices supporting line bit rate auto negotiation according to an embodiment of the present disclosure. As shown in FIG. 7, the alignment block may be used to align the two network devices for time synchronization, line rate options (such as CPRI line bit rate options), line rate order for line rate iteration, iteration time interval, and iteration start time. The time synchronization can be done by some tool like NTP and the purpose is to ensure the two devices will have synchronized iterate steps. The last 3 options (i.e., line rate order for line rate iteration, iteration time interval, and iteration start time) can be done by configuration, or by a message between the two devices. The rate iterator may be used to iterate and set the bit rate (such as CPRI bit rate) to the port in the aligned order, time interval and start time. The detector may be used to detect if the bidirectional traffic (such as CPRI traffic) is OK and the port status is OK, so that to decide if a new line bit rate option should be iterated or can lock on the current line bit rate option. The locker may be used to keep the current bit rate option as the detector assert it's the wanted status.

Embodiments herein afford many advantages, of which a non-exhaustive list of examples follows. Some embodiments can solve the line rate auto-negotiation problem when there are two or more network devices used to bridge the communication of two communication devices. Some embodiments be used in Ethernet fronthaul equipments to solve the CPRI auto-negotiation problem. For example, such auto-negotiation is mandatory for some RAN deployment. Without line rate auto-negotiation, the baseband and the remote radio unit of a base station system can only worked at predefined line bit rate or can not communicate with each other. The embodiments herein are not limited to the features and advantages mentioned above. A person skilled in the art will recognize additional features and advantages upon reading the following detailed description.

Figure 8:
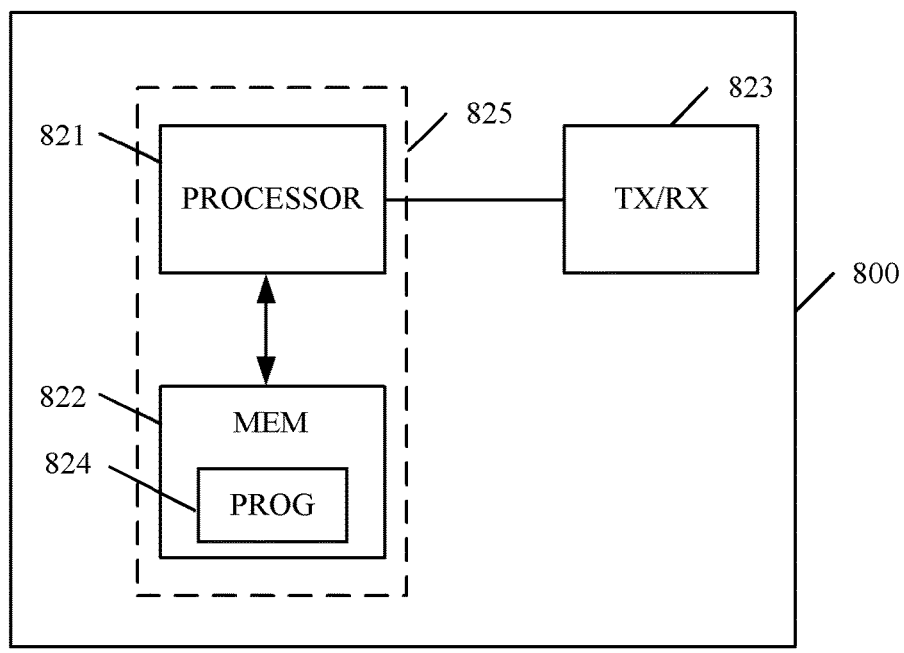
FIG. 8 is a block diagram showing an apparatus suitable for use in practicing some embodiments of the disclosure.

FIG. 8 is a block diagram showing an apparatus suitable for use in practicing some embodiments of the disclosure. For example, any one of the first network device and the second network device described above may be implemented through the apparatus 800.

The apparatus 800 comprises at least one processor 821, such as a DP, and at least one MEM 822 coupled to the processor 821. The apparatus 820 may further comprise a transmitter TX and receiver RX 823 coupled to the processor 821. The MEM 822 stores a PROG 824. The PROG 824 may include instructions that, when executed on the associated processor 821, enable the apparatus 820 to operate in accordance with the embodiments of the present disclosure. A combination of the at least one processor 821 and the at least one MEM 822 may form processing means 825 adapted to implement various embodiments of the present disclosure.

Various embodiments of the present disclosure may be implemented by computer program executable by one or more of the processor 821, software, firmware, hardware or in a combination thereof.

The MEM 822 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 821 may be of any type suitable to the local technical environment, and may include one or more of general purpose computers, special purpose computers, microprocessors, digital signal processors DSPs and processors based on multicore processor architecture, as non-limiting examples.

In an embodiment where the apparatus is implemented as or at the first network device, the memory 822 contains instructions executable by the processor 821, whereby the first network device operates according to the method 500 as described in reference to FIG. 5.

In an embodiment where the apparatus is implemented as or at the second network device, the memory 822 contains instructions executable by the processor 821, whereby the first network device operates according to the method 600 as described in reference to FIG. 6.

Figure 9:
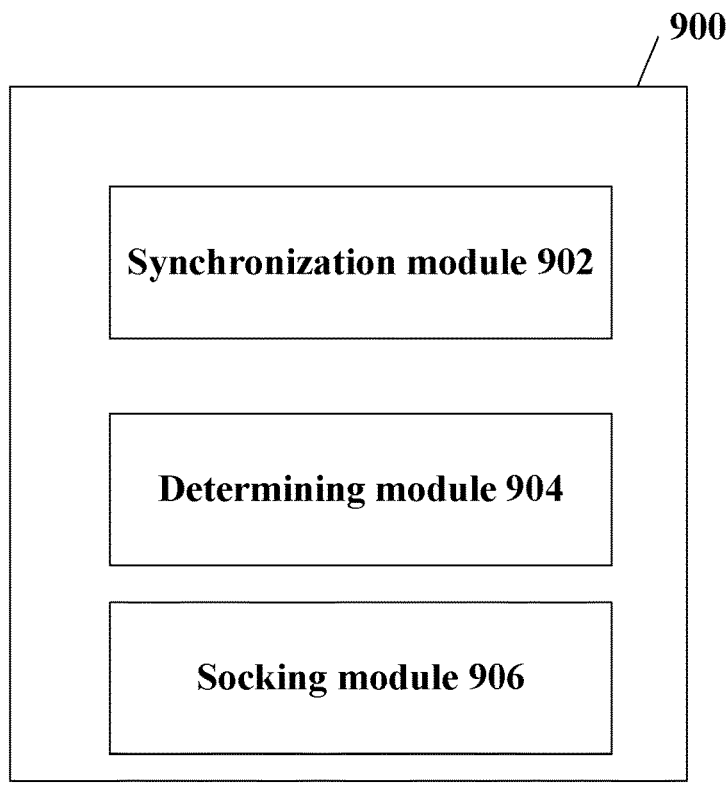
FIG. 9 is a block diagram showing a first network device according to an embodiment of the disclosure.

FIG. 9 is a block diagram showing a first network device according to an embodiment of the disclosure. As shown, the first network device 900 comprises a synchronization module 902, a determining module 904 and a locking module 906. The synchronization module 902 may be configured to reach a synchronization state with a first communication device based on alignment information of a first interface of the first network device. The first interface of the first network device is connected with the first communication device and the alignment information of the first interface includes at least one of a line rate order for line rate iteration, an iteration time interval and an iteration start time. The determining module 904 may be configured to determine whether a second network device has reached the synchronization state with a second communication device at a same line rate as the first interface of the first network device. The second network device includes a second interface connected with the second communication device, the second network device tries to reach the synchronization state with the second communication device based on the same alignment information as the first interface of the first network device. The locking module 906 may be configured to lock the same line rate at the first interface of the first network device when both the first network device and the second network device have reached the synchronization state with respective communication devices at the same line rate.

Figure 10:
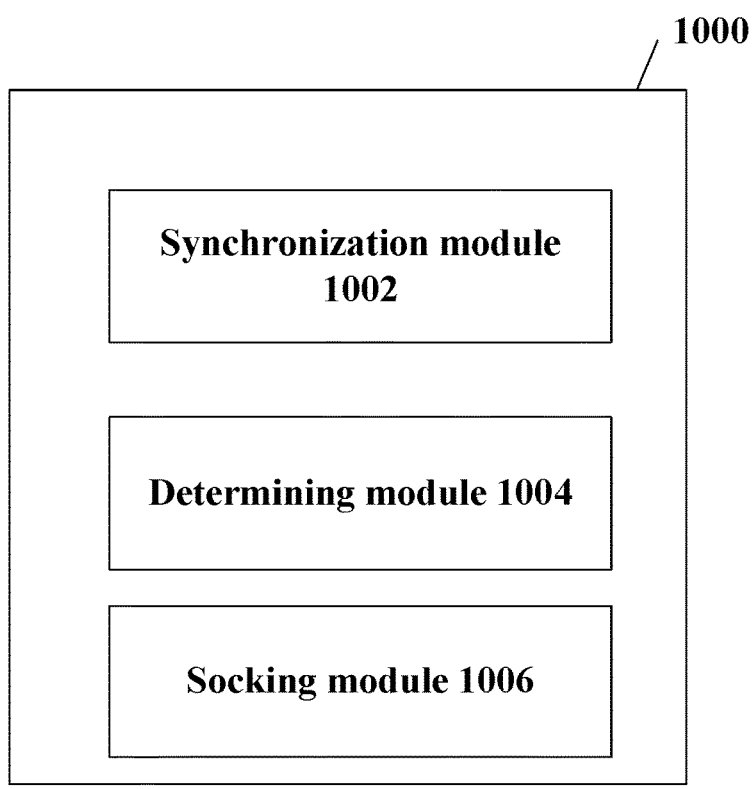
FIG. 10 is a block diagram showing a second network device according to an embodiment of the disclosure.

FIG. 10 is a block diagram showing a second network device according to an embodiment of the disclosure. As shown, the second network device 1000 comprises a synchronization module 1002, a determining module 1004 and a locking module 1006. The synchronization module 1002 may be configured to reach a synchronization state with a second communication device based on alignment information of a second interface of the second network device. The second interface of the second network device is connected with the second communication device and the alignment information of the second interface includes at least one of a line rate order for line rate iteration, an iteration time interval and an iteration start time. The determining module 1004 may be configured to determine whether a first network device has reached the synchronization state with a first communication device at a same line rate as the second interface of the second network device. The first network device includes a first interface connected with the first communication device, the first network device tries to reach the synchronization state with the first communication device based on the same alignment information as the second interface of the second network device. The locking module 1006 may be configured to lock the same line rate at the second interface of the second network device when both the first network device and the second network device have reached the synchronization state with respective communication devices at the same line rate.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a first network device, comprising:
   reaching a synchronization state with a first communication device based on alignment information of a first interface of the first network device, wherein the first interface of the first network device is connected with the first communication device and the alignment information of the first interface includes at least one of a line rate order for line rate iteration, an iteration time interval and an iteration start time;
   communicating with a second network device to auto-negotiate a line rate, in which the second network device operates independently from the first network device to reach a synchronization state with a second communication device based on alignment information of a second interface of the second network device, wherein the second interface of the second network device is connected with the second communication device and the alignment information of the second interface includes at least one of a line rate order for line rate iteration, an iteration time interval and an iteration start time;
   determining whether the second network device has reached a synchronization state with the second communication device based on alignment information of the second interface of the second network device connected with the second communication device; and
   when both the first network device and the second network device have reached a same synchronization state with respective communication devices at a same line rate, locking the same line rate at the first interface of the first network device and at the second interface of the second network device in order to transfer data.

2. The method according to claim 1, wherein when both the first network device and the second network device have not reached the synchronization state with respective communication devices at the same line rate, iteratively performing at least one of reaching, detecting and locking by using a next line rate.

3. The method according to claim 1, wherein a line rate is selected from a plurality of line rates in a round robin fashion.

4. The method according to claim 1, wherein the first network device and the second network device belong to a transport network over which a link connected between the first communication device and the second communication device is bridged.

5. The method according to claim 1, wherein the first network device and the second network device are time synchronized; and wherein the alignment information of the first interface of the first network device is configured by a message or preconfigured.

6. The method according to claim 1, wherein the first network device is one of a radio over Ethernet (RoE) device, a flexible Ethernet device, an optical transport network (OTN) device and a wavelength division multiplexing (WDM) device and wherein the second network device is one of a RoE device, a flexible Ethernet device, an OTN device, and a WDM device.

7. The method according to claim 1, wherein the first communication device includes one of a Radio Equipment Control (REC) device or a Radio Equipment (RE) device and wherein the second communication device includes one of a REC device or a RE device.

8. The method according to claim 1, wherein the first interface of the first network device includes a common public radio interface (CPRI) and wherein the second interface of the second network device includes a CPRI.

9. A method performed by a second network device, comprising:
   reaching a synchronization state with a second communication device based on alignment information of a second interface of the second network device, wherein the second interface of the second network device is connected with the second communication device and the alignment information of the second interface includes at least one of a line rate order for line rate iteration, an iteration time interval and an iteration start time;
   communicating with a first network device to auto-negotiate a line rate, in which the first network device operates independently from the second network device to reach a synchronization state with a first communication device based on alignment information of a first interface of the first network device, wherein the first interface of the first network device is connected with the first communication device and the alignment information of the first interface includes at least one of a line rate order for line rate iteration, an iteration time interval and an iteration start time;
   determining whether the first network device has reached a synchronization state with the first communication device based on alignment information of the first interface of the first network device connected with the first communication device; and
   when both the first network device and the second network device have reached same synchronization state with respective communication devices at a same line rate, locking the same line rate at the second interface of the second network device and at the first interface of the first network device in order to transfer data.

10. The method according to claim 9, wherein when both the first network device and the second network device have not reached the synchronization state with respective communication devices at the same line rate, iteratively performing at least one of reaching, detecting and locking by using a next line rate.

11. The method according to claim 9, wherein a line rate is selected from a plurality of line rates in a round robin fashion.

12. The method according to claim 9, wherein the first network device and the second network device belong to a transport network over which a link connected between the first communication device and the second communication device is bridged.

13. The method according to claim 9, wherein the first network device and the second network device are time synchronized; and wherein the alignment information of the second interface of the second network device is configured by a message or preconfigured.

14. The method according to claim 9, wherein the first network device is one of a radio over Ethernet (RoE) device, a flexible Ethernet device, an optical transport network (OTN) device and a wavelength division multiplexing (WDM) device and wherein the second network device is one of a RoE device, a flexible Ethernet device, an OTN device, and a WDM device.

15. The method according to claim 9, wherein the first communication device includes one of a Radio Equipment Control (REC) device or a Radio Equipment (RE) device and wherein the second communication device includes one of a REC device or a RE device.

16. The method according to claim 9, wherein the first interface of the first network device includes a common public radio interface (CPRI) and wherein the second interface of the second network device includes a CPRI.

17. An apparatus implemented in a first network device, comprising:
a processor; and
a memory coupled to the processor, said memory containing instructions which, when executed by said processor, cause said apparatus to:
reach a synchronization state with a first communication device based on alignment information of a first interface of the first network device, wherein the first interface of the first network device is connected with the first communication device and the alignment information of the first interface includes at least one of a line rate order for line rate iteration, an iteration time interval and an iteration start time;
communicate with a second network device to auto-negotiate a line rate, in which the second network device operates independently from the first network device to reach a synchronization state with a second communication device based on alignment information of a second interface of the second network device, wherein the second interface of the second network device is connected with the second communication device and the alignment information of the second interface includes at least one of a line rate order for line rate iteration, an iteration time interval and an iteration start time;
determine whether the second network device has reached a synchronization state with the second communication device based on alignment information of the second interface of the second network device connected with the second communication device; and
when both the first network device and the second network device have reached a same synchronization state with respective communication devices at a same line rate, lock the same line rate at the first interface of the first network device and at the second interface of the second network device in order to transfer data.

18. An apparatus implemented in a second network device, comprising:
a processor; and
a memory coupled to the processor, said memory containing instructions which, when executed by said processor, cause said apparatus to:
reach a synchronization state with a second communication device based on alignment information of a second interface of the second network device, wherein the second interface of the second network device is connected with the second communication device and the alignment information of the second interface includes at least one of a line rate order for line rate iteration, an iteration time interval and an iteration start time;
communicate with a first network device to auto-negotiate a line rate, in which the first network device operates independently from the second network device to reach a synchronization state with a first communication device based on alignment information of a first interface of the first network device, wherein the first interface of the first network device is connected with the first communication device and the alignment information of the first interface includes at least one of a line rate order for line rate iteration, an iteration time interval and an iteration start time;
determine whether the first network device has reached a synchronization state with the first communication device based on alignment information of the first interface of the first network device connected with the first communication device; and
when both the first network device and the second network device have reached a same synchronization state with respective communication devices at a same line rate, lock the same line rate at the second interface of the second network device and at the first interface of the first network device in order to transfer data.

* * * * *